(12) United States Patent
Rochette (10) Patent No.: US 9,213,751 B2
(45) Date of Patent: Dec. 15, 2015

(54) METHOD OF INCREASING CAPACITY TO PROCESS OPERATIONAL DATA

(71) Applicant: AppFirst, Inc., New York, NY (US)

(72) Inventor: Donn Rochette, Fenton, IA (US)

(73) Assignee: AppFirst, Inc., New York, NY (US)

( * ) Notice: Subject to any disclaimer, the term of this patent is extended or adjusted under 35 U.S.C. 154(b) by 216 days.

(21) Appl. No.: 14/074,548

(22) Filed: Nov. 7, 2013

(65) Prior Publication Data

US 2014/0136482 A1    May 15, 2014

Related U.S. Application Data

(60) Provisional application No. 61/726,900, filed on Nov. 15, 2012.

(51) Int. Cl.
*G06F 17/00* (2006.01)
*G06F 17/30* (2006.01)
*G06F 9/50* (2006.01)

(52) U.S. Cl.
CPC ........ *G06F 17/30575* (2013.01); *G06F 9/5083* (2013.01)

(58) Field of Classification Search
CPC ....... G06F 9/505; G06F 1/263; G06F 9/4881; G06F 9/5083; G06F 11/3433; G06F 3/005
See application file for complete search history.

(56) References Cited

PUBLICATIONS

Kate Matsudaira, "The Architecture of Open Source Applications", vol. 2, http://www.aosabook.org/en/distsys.html , Nov. 1, 2013.
Rajkumar Buyya (editor), "High Performance Cluster Computing: Architectures and Systems, vol. 1" pp. 9-11, ISBN 0-13-013784-7, Prentice Hall PTR, NJ, USA, 1999.

*Primary Examiner* — Truong Vo
(74) *Attorney, Agent, or Firm* — Matthew A. Pequignot; Pequignot + Myers LLC (57) ABSTRACT

A first-system has a plurality of interconnected computers which receive operational data from remote data sources. The first-system has a software application for processing the operational data received from remote data sources and the operational data characterizes performance of one or more software applications running on the remote data sources. A load capacity "L" for the first-system is determined; wherein L is the number of remote data sources that can be processed before the system becomes overloaded. The first-system is repeatedly monitors remote data sources to determine their number. When the number of remote data sources exceeds a predetermined fraction of L the first-system is replicated and replications are installed. When a client requests data from one of the systems, using a time stamp the data is automatically provided. The first-system is replicated as more processing power is required conditional upon the load capacity of the system.

7 Claims, 5 Drawing Sheets

METHOD OF INCREASING CAPACITY TO PROCESS OPERATIONAL DATA

CROSS-REFERENCE TO RELATED APPLICATIONS

The present invention claims priority from U.S. Provisional Patent Application Ser. No. 61,726,900 filed Nov. 15, 2012, which is incorporated herein by reference.

FIELD OF THE INVENTION

This invention relates generally to scaling computer systems used for processing operational data from remote data sources, wherein the operational data characterizes software applications running or executing on the remote data sources.

BACKGROUND OF THE INVENTION

Operating and maintaining complex world-wide web (WWW) software applications, hereafter termed web applications, has proven to be quite complex. A web application is commonly described as any application that uses a web browser as a client. In some instances a web application may also refer to a computer software application that is coded to execute in the context of a browser. Typically there is a server component that provides information to the web-based client utilizing network connections. A distributed web application refers to a system that utilizes information provided by servers in a distributed or multi-tiered configuration.

Experience from operations personnel, software developers and systems administrators indicates that the ability to determine the status of a complex web application as well as problem resolution is enhanced by the use of relevant and timely data. The source of this data comes from metrics gathered from within application components and system infrastructure. Metrics are the measure of the efficiency and effectiveness of an operation or process.

The status of a web application represents the ability of the application to meet certain criteria, such as its service level agreements. A service level agreement may be a formal written agreement, or it may be informal expectations of an application to perform in a certain manner. If the application is expected, by way of example, to display a web page with specific information in less than four or five seconds, then the status of the web application is the measurement of that application's ability to display the web page in the expected time frame.

Problem resolution of a web application refers to the process of identifying that the status of a web application indicates that the application is not meeting its' service level agreements and taking action to correct any related issue.

The definitive set of metrics that are relevant to a distributed web application are not well understood. A fundamental issue stems from the fact that technologists rarely know what specific information will be required for problem resolution before it is required. To this end, it is preferable to gather and store a large set of information in case it is needed.

A system that provides the relevant set of metrics and information required for operation of a distributed web-based software application would have to collect data from the executing software application, aggregate the data, create summaries of the data, store the data and provide the data in a timely manner. In a design where data is collected from remote servers and stored in a central location, a constant stream of data would be created, originating from remote servers.

A system designed to collect very detailed operational data from remote data sources requires a significant quantity of computer resources to accomplish this task; and the load on such a system is directly related to the number of remote data sources being processed. As the number of remote data sources increases, a system processing the data from these sources needs to scale to handle the increase in load.

Prior art approaches cause a system for processing operational data from remote data sources to be scaled out by expanding the first system. In this manner a first system itself is extended by adding more compute resources to the first system. In this manner, the issue of scale is solved by adding additional processing power, storage and network bandwidth as needed to the first system.

In the past, several techniques have been utilized to accomplish scaling-out of a first system. Clustering of commodity PC hardware is a technique used to scale-out a first system. A paper entitled "High Performance Cluster Computing: Architectures and Systems, Volume 1" (Rajkumar Buyya (editor), ISBN 0-13-013784-7, Prentice Hall PTR, NJ, USA, 1999) provides an overview of cluster technologies and approaches. Sharding is another approach to scaling out a first system. A sharding approach results in distributing remote data sources across different data handling processes, or shards, such that each shard can only handle a set number of remote data sources, and as remote data sources increase more shards are added. A paper entitled "Scalable Web Architecture and Distributed Systems" (Kate Matsudaira, "The Architecture of Open Source Applications", http://www.aosabook.org/en/distsys.html) provides a detailed discussion of the use of sharding techniques.

There are limits to scaling a system by simply adding additional resources to that system. The software that is processing the operational data must be designed in such a way that it can be scaled. Additional hardware resources can be added to the system that needs to be expanded, but if the software is not developed to support scaling, the additional hardware will not result in a required increased capacity of that system.

Scaling-out of a system that processes operational data from remote data sources by adding additional compute resources results in the problem of designing for unlimited scale. Software developers are required to create systems that support changing load requirements. It becomes quite difficult to validate that a system functions properly if the load presented to such a system, in the form of remote data sources, is ever-increasing.

A method is required to support increased capacity of a system that processes operational data from remote data sources in such a way that the software supporting such a system does not have to be designed for infinite scale. This invention defines a method for replication of a first system as opposed to a scale out of a first system. This replication allows a system to support ever-increasing capacity without the need to design for infinite scale.

SUMMARY OF THE INVENTION

In accordance with this invention, a system and method of up-scaling, or out-scaling, a system for processing operational data that comes from remote data sources, wherein the operational data characterizes software applications running on the remote data sources without attempting to support infinite scale. The amount of load supported by a system processing operational data from remote data sources is determined. A system is installed that will support the initial capacity. The load of the system is measured and tracked as the number of remote data sources increases. The load, as measured by the number of remote data sources, should not be allowed to increase beyond the value determined for the initial capacity. When the load increases to near capacity of the initial load, a replica of the first system is installed to increase overall capacity to process data from the remote data sources. Multiple replications can occur to form a plurality of replicated first systems as determined by the load, measured by the number of remote data sources.

In order to access the data aggregated and summarized by a system for processing operational data that comes from remote software applications, a retrieval capability is provided. A retrieval component is capable of reading data from the first system and the replicated first systems, and furthermore is capable of locating the data in a particular replicated system in order to satisfy any request for data.

In accordance with this invention a method of increasing capacity of a first system to process operational data is provided, wherein the first system has a plurality of interconnected computers connected to receive the operational data from remote data sources, wherein the first system has a software application for processing the operational data received from remote data sources, wherein the operational data characterizes an aspect of performance of one or more software applications running on the remote data sources. The method comprises:

a) determining a load capacity "L" for the first system to be expanded, wherein L>100 and wherein L is the number of remote data sources that can be processed before the system becomes overloaded;
b) monitoring incoming remote data sources to determine their number;
c) in dependence upon the number of remote data sources exceeding a predetermined fraction of L greater than 0.5 L and <L, replicating the first system to form a plurality of replicated first systems and installing the replicated first systems to increase overall capacity to process data from the remote data sources;
d) providing a retrieval system to read data from the first system and the replicated first systems, wherein the retrieval system is capable of locating the data in a particular replicated system or the first system based on a time stamp and on a particular one of the one or more software applications running on the remote data sources, wherein upon a request for data the retrieval system returns the requested data to the requestor.

In accordance with the invention there is provided a method of increasing capacity of a first system to process operational data, wherein the first system has a plurality of interconnected computers connected to receive the operational data from remote data sources, wherein the first system has a software application for processing the operational data received from remote data sources, wherein the operational data characterizes an aspect of performance of one or more software applications running on the remote data sources, the method comprising:

a) determining a load capacity "L" for the first system to be expanded, wherein L>100 and wherein L is the number of remote data sources that can be processed before the system becomes overloaded;
b) while the first system is processing data, repeatedly monitoring incoming remote data sources to determine their number;
c) in dependence upon the number of remote data sources exceeding a predetermined fraction of L greater than 0.5 L and <L, repeatedly replicating the first system to form a plurality of replicated first systems and installing the replicated first systems to increase overall capacity to process data from the remote data sources while the first system is processing data;
d) upon request from a client, retrieving from the first system or one of the replicated systems, data related to a particular requested software application by using a time stamp or a time series, in the absence of information related to which of the first and replicated systems the data resides in.

BRIEF DESCRIPTION OF THE DRAWINGS

Exemplary embodiments of the invention will now be described, in conjunction with the drawings in which.

DETAILED DESCRIPTION

Figure 1:
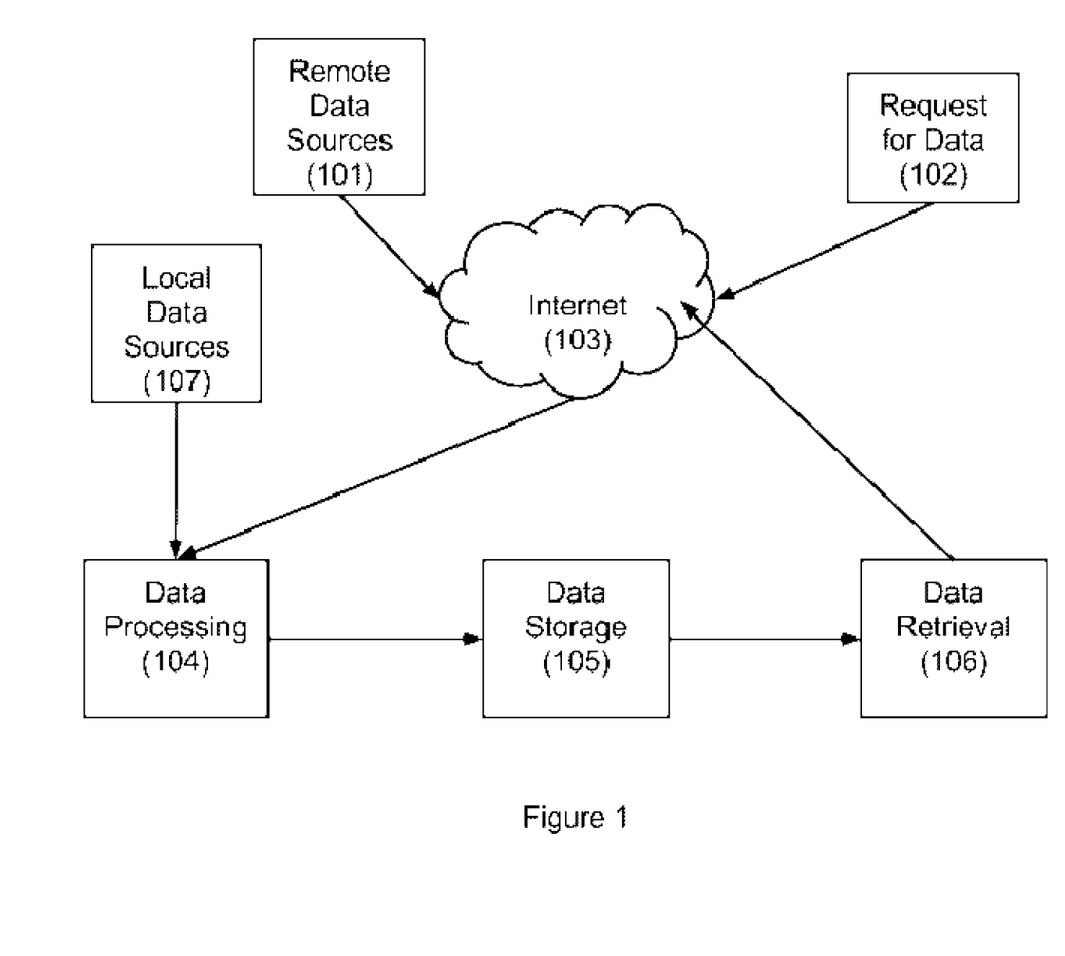
FIG. 1 is a prior art diagram illustrating a system for processing operational data.

Fundamentally, the invention disclosed herein defines a method for scaling a system for processing operational data that comes from remote software applications. A system of this type is described in U.S. published patent application number 20080222160 in the name of Rochette et al., entitled System and Method for Information Extraction From within an Active Application During Execution, incorporated herein by reference for all purposes. Such a system, as shown in FIG. 1, requires that incoming data 101 and 107 be aggregated from various sources and various time sequences. The aggregation of data is accomplished by data processing, 104. In order to maintain performance requirements for data retrieval 106, numerous summaries of the data are created. The processing of the data 104, in the form of aggregation and summarization, requires a certain amount of compute resources minimally in the form of CPU bandwidth, memory space and network throughput.

The capacity of such a system is determined by the load presented to the system. The salient factor in determining the load on such a system is the volume of data collected from data sources 101 and 107, which characterizes the behavior, and profile of remote software applications. It is not uncommon for a system to receive greater than 1 GB of data per day from an individual source. The load capacity, L, of the first system is therefore determined by the number of data sources 101 and 107.

As the number of remote data sources 101, and the volume of information received therein, increases the system that is aggregating and summarizing the data must scale-out, by way of adding additional resources to handle the increased load. Remote data sources 101 are defined to be sources of data that originate from any compute resource that is not itself a part of the first system. As such, remote data sources 101 communicate their information to the first system over the Internet or local data sources 107 over network connections local to the first system.

The process of determining and tracking a load L requires the number of remote data sources 101 and 107 to be counted and tracked. In accordance with a preferred embodiment of this invention remote data sources can be tracked by examining information provided by the remote data sources 101 and 107. A unique data source is determined by a combination of the three tuple of 1) peer IP address, 2) hostname and 3) the time that the connection was first made. In accordance with a preferred embodiment of this invention a globally unique identifier can be provided to each remote data source. This identifier can be utilized to effectively track and count remote data sources 101 and 107 as data is processed 104.

Given an increased use of cloud computing, advances in the automation of system deployment and broad use of commodity hardware, it is not uncommon for a system that is processing operational data from software applications to experience significant changes in load. Responding to dynamic changes in load increases in the volume of data that needs to be processed 104, presents a singular challenge for scalability in such a system. If a system is able to support, for example, the processing of information from 1,000 remote data sources, it may not be able to handle the load imposed by 5,000 remote data sources, or for example, 10,000.

Figure 2:
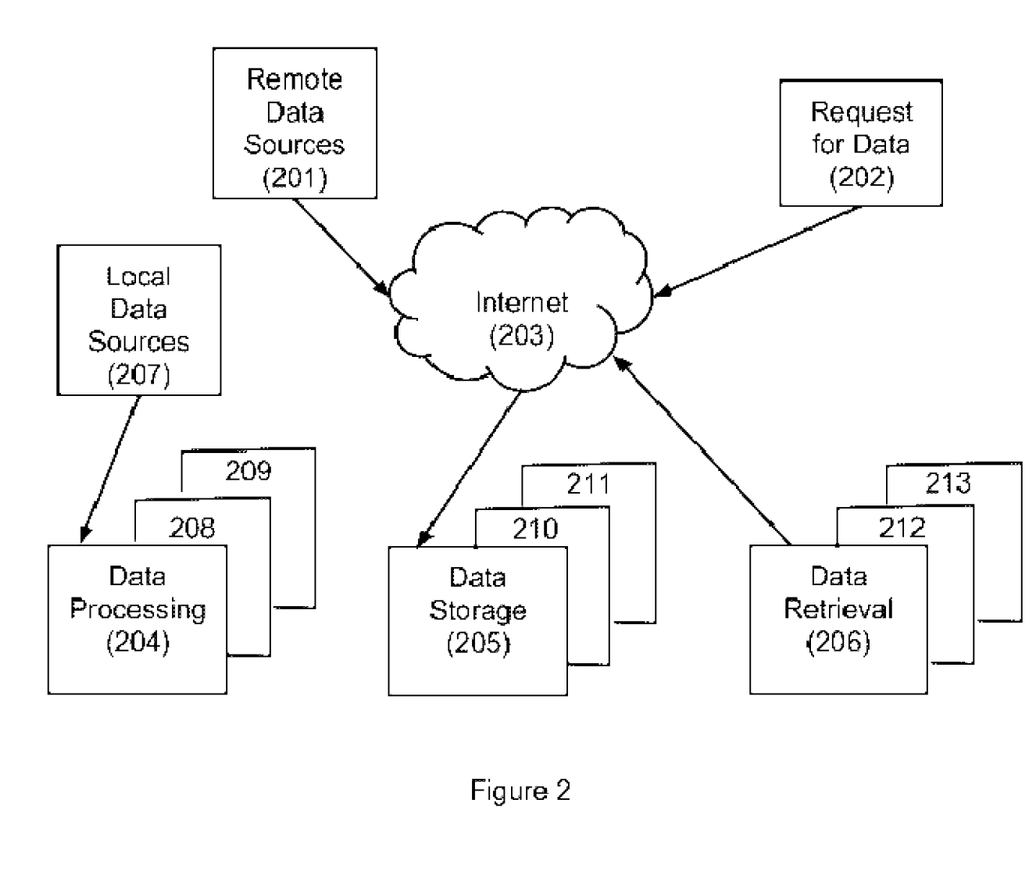
FIG. 2 represents scaling of a first system as defined in prior art.

The effect of supporting an ever-increasing load profile may result in an attempt to design such a system for unlimited scale. Such an approach is illustrated in FIG. 2. However, attempting to design for unbounded load is not a desirable scenario. It can be quite difficult to test and validate a system where load profiles increase somewhat frequently. The ability to provide sources of data in a test environment, distinct from live or production data, can be difficult and quite costly to provide. This invention presents an alternative to such an approach.

The prior art describes that scale is achieved by extending a first system by adding additional resources 208, 209, 210, 211, 212 and 213, to the first system. Additional compute resources are added for processing data 208 and 209. Very often a sharding technique is utilized to increase the capacity of data processing 204. A sharding approach might include distributing remote data sources 201 across different data handling processes, or shards 204, 208 and 209, such that each shard can only handle a fixed number of remote data sources 201, and as remote data sources increase more shards are added. The prior art defines that storage capacity 205 is increased by adding additional compute resources 210 and 211. It is common in the prior art for storage to be configured in a cluster, where 205, 210 and 211 represent a cluster of commodity PC hardware. With this approach storage capacity is increased by adding nodes 210 and 211 to a cluster.

Figure 3:
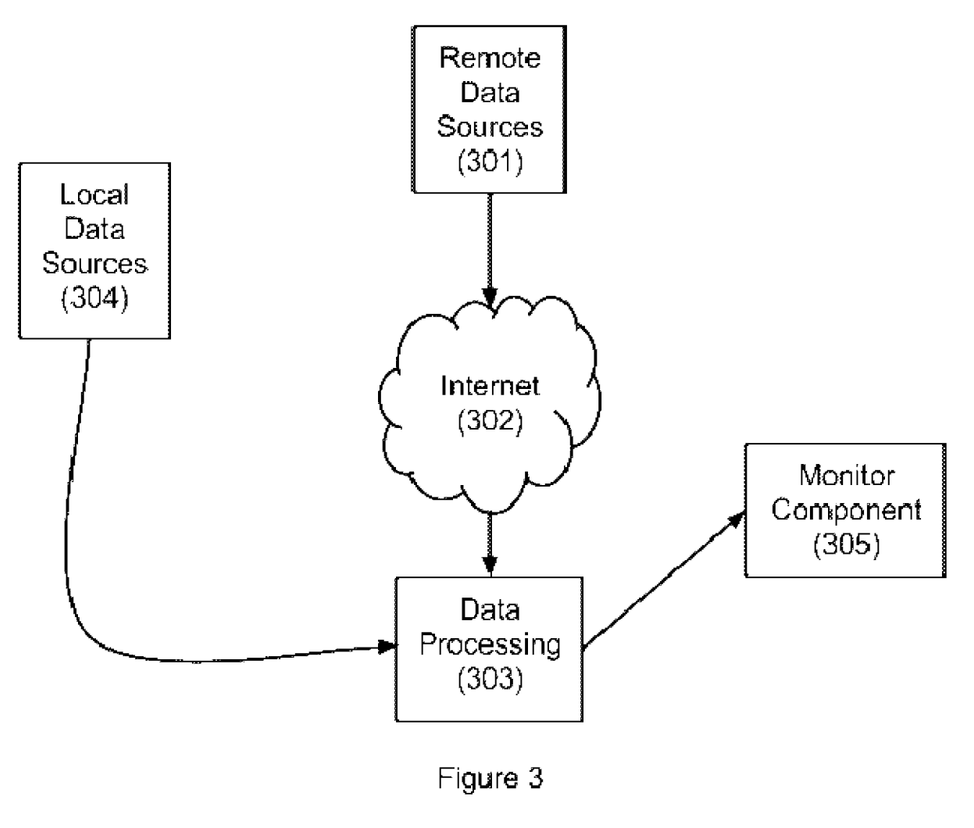
FIG. 3 illustrates that load is measured for each system processing operational data which characterizes software applications.
Figure 4:
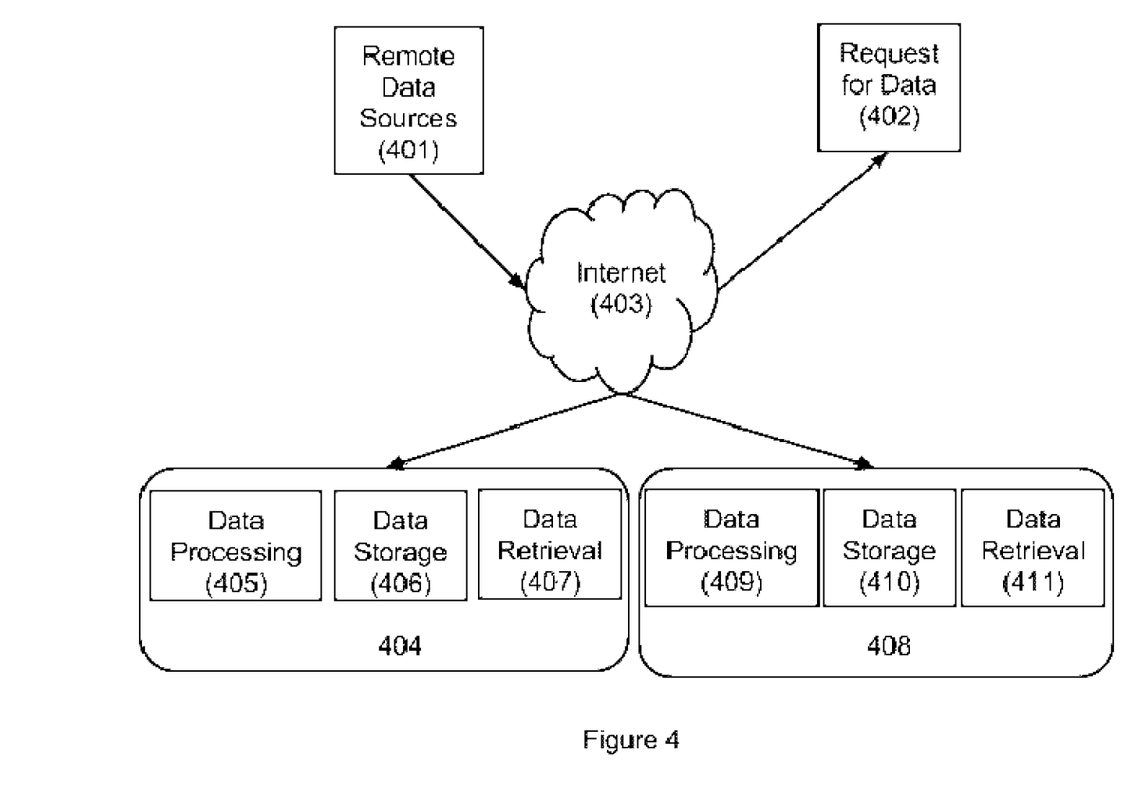
FIG. 4 illustrates a first system for processing operational data, which characterizes software applications wherein the first system is replicated to create a second system.

The invention defined herein describes that a first system for processing operational data from remote applications 404 be configured to support a load for a predetermined initial capacity. This system is not designed to support infinite scale. Rather, scale is achieved by replication of a first system 404 to create a replicated first system 408 as many times as is required to support a load profile. The choice of an initial load capacity is made, as shown in FIG. 3, based on technology limits and requirements as well as cost.

In accordance with this invention, once an initial load is determined, the first system 303 is monitored to determine the load profile that is applied to the system. The load, L, is determined by counting the number of remote data sources that are communicating operational data which characterizes an aspect of performance of one or more software applications running on the remote data sources. Neither the first system 404 nor a replicated system 408 is allowed to become overloaded. Overload is measured by repeatedly monitoring 305 the data processing elements 303. An overload occurs when the system can no longer process the incoming data 301; when data processing elements 303 cannot process the data sources from 301 in the required time interval. Once load increases to near capacity, or a predetermined capacity, the first system 404 is replicated providing a second system 408 capable of handling twice the load. Load is not allowed to increase beyond that determined as the initial capacity. This applies to the first system 404 as well as any and all replications 408 of the first system. Preferably load profiles are consistent among the first system and replicated systems. However, this consistency is not required in all cases.

Observing changes in load can be accomplished in several ways. A common approach entails monitoring 305 compute resources consumed by the system that is processing operational data 303 from remote software applications. In practice this monitoring entails the use of scripts, small programs, that run at predetermined intervals to gather data describing the compute resources being consumed by the system that is processing operational data. Experience shows that this approach is not as effective as others due to the indirect nature of the monitor data. Information describing resource usage of a first or replicated system does not provide specific insight into the number of remote software applications sending operational data to a first or replicated system, nor does it provide insight into the volume of data being processed by a first or replicated system.

Measuring the volume of network traffic 301 and 304 being sent to a system that is processing operational data from remote software applications 303 represents a slight improvement in how a load profile is monitored. In the past, monitoring of network traffic has been accomplished by creating discrete software applications that gather information related to network traffic by polling services provided by an operating system. Preferably network traffic is measured by creating software that extracts network details from within each process by examining every socket that is created. Wherein a socket is a software abstraction used to establish network connections. The information obtained in this manner is more directly related to the number of remote software applications sending operational data to a first system 404 or replicated system 408 and the amount of information being processed by such a system. This approach to monitoring a load profile is indirect in that it requires an inference between network traffic and the number of remote sources and the volume of data being processed.

Preferably the software used to process operational data from remote software applications is coded to track and report specific information describing both the number of remote software applications providing data as well as specific detail describing the amount of data being processed by a first system 404 or a replicated system 408.

The processed data is requested by remote clients 402. Data is provided to remote clients 402 as clients utilize REST APIs. Where REST defines a Representational State Transfer implemented as an Application Programming Interface (API). A REST model is intended to abstract the architectural elements within a distributed application. A REST API is a set of operations that can be invoked using the actual URL as parameters for a specific operation. Wherein URL stands for Uniform Resource Locator. A URL is a formatted text string used by Web browsers, email clients and other software to identify a network resource on the Internet. Statistics counters are incremented as data from remote applications is delivered from remote data sources 401.

Statistics counters are implemented in software by application programs residing on data processing elements 405 and 409 of the first system 404 or any one of a replicated system 408. Additional statistics counters are incremented as data is processed. The statistics counters are exported from the elements within the first or replicated systems 303 to a monitoring capability 305. The monitoring capability 305 provides a means to visualize the statistics counters as well as to create alerts delivered to operations personnel.

When the load increases to near capacity of the initial load the system that is processing operational data from remote software applications is not extended to support the additional load as may be customary. A first system 404 of this type is deployed and tested to ensure that it will effectively support the initial load. Load is not allowed to increase beyond that determined as the initial capacity for which the system has been validated. As the load on the first system 404 approaches a predetermined near capacity a replica of the first system 408 is installed. In this manner, the two systems, the first system 404 and the replicated system 408, together are then capable of sustaining twice the initial load value.

The first system 404 and the replicated system 408 represent the same capability; they are physical duplicates; hardware within the first system 404 is replicated in the second system 408. They operate in parallel. Any number of replicated systems can be installed as determined by the load profile. By way of example, if a first system 404 is configured to process operational data from 1,000 remote data sources, when the load profile reaches near capacity, for example operational data from 900 remote data sources, a replica of the first system 408 is installed. The combination of the first system 404 and the replicated system 408 are then capable of processing the operational data from 2,000 remote data sources. As the load profile increase past 900, to more than 1,000 software applications the system is capable of supporting the load.

Replication of a first system 404 can be accomplished in a number of ways. Where the first system is hosted in a cloud computing environment, or similar environment that supports the deployment of systems under software control, it may be possible to deploy a replicated system entirely in software. The replication of a first system using this type of environment can be fully automated. In this case software in the data processing element 405 uses statistics counters to determine when a first system reaches near capacity and then, using cloud compute services, software will deploy servers, install services and configure systems in order to create a replica of the first system. Where the first system is hosted in a physical environment, systems are deployed manually. The hardware must be installed and connected to a network manually. In this case a replication of the hardware is deployed and software is used to install services and configure systems in order to create a replica of the first system. Independent of the means utilized to deploy systems the data processing element 405 uses statistics counters to determine when a first system reaches near capacity and in turn initiates replication.

Data received from remote software applications can be delivered to either the first system 404 or a replicated system 408 as these systems are duplicates. In accordance with a preferred embodiment of this invention a plurality of collection mechanisms deliver data from remote data sources 401 utilized to gather operational data characterizing a software application and deliver it to the first system 404 or a replicated system 408. The collection mechanisms are configured to send their data to a specific system. This configuration is accomplished by means of a configuration file local to the collection mechanism. That is, the destination used by a remote collection mechanism is controlled by applying changes to a configuration file local to the collection mechanism. In accordance with a preferred embodiment of this invention a local configuration file can be managed by a remote web application. In this manner the load on the system used to process operational data from software applications can be balanced between the first system 404 and any replicated systems 408. Preferably the configuration of a collection mechanism can be changed at any time.

Figure 5:
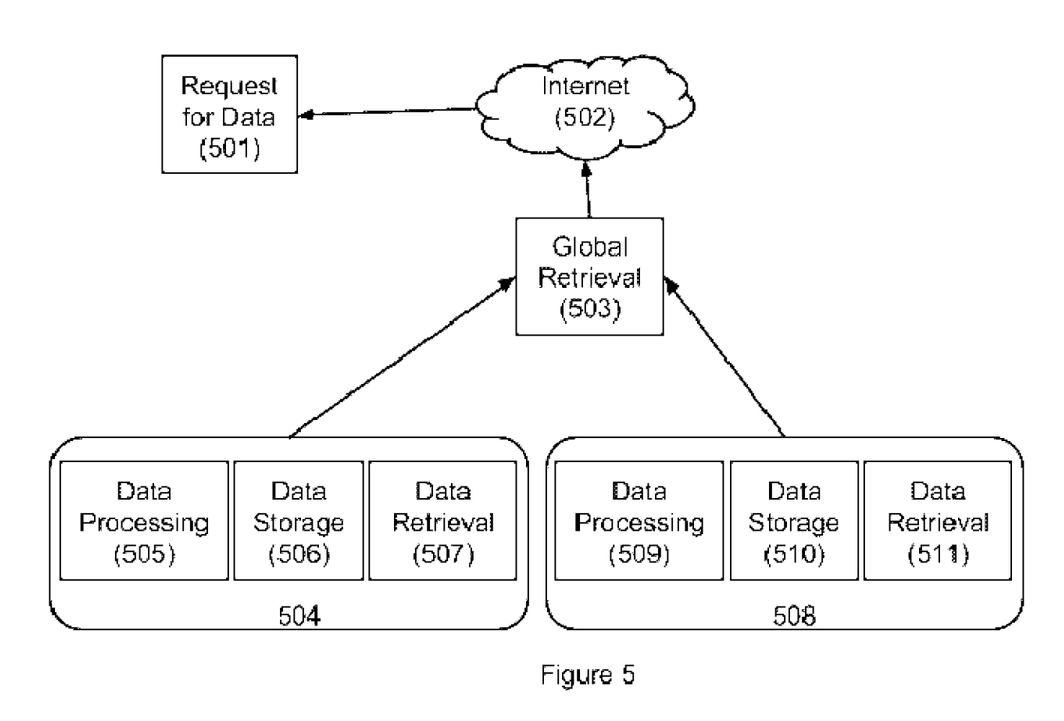
FIG. 5 represents a retrieval component of the system and method of this invention.

When operational data from remote software applications have been processed 505 and 509, the data has been aggregated and summarized, the results should be made available for use in the creation of various analytics. To this end a retrieval component 507 and 511 is provided. A retrieval component 507 and 511 represents software capable of locating, searching, reading and returning information upon request. A retrieval component reads processed information created by 504 and 509 from a persistence store 506 or 510. A retrieval component is capable of reading data from the first system 504 and any replication of the first system 508.

Given that the results of processing operational data characterizing remote software applications can be accomplished by any number of the first system 504 or any number of replicas of the first system 508 queries of a specific data set 501 requires a priori knowledge of which system holds the necessary information. The requestor of a specific data set 501 need not be required to obtain a priori knowledge of information locality. Rather, the retrieval system 507 and 511 maintains details of where any given data set resides. In this manner a request for a particular data set 501 can be made without the need to specify locality of the data. The retrieval component 507 and 511 resolves data locality and satisfies the request.

A retrieval component 507 and 511 utilizes a time series, the specific application detail being requested, and configuration details of remote collection mechanisms to maintain information locality. Wherein a time series represents a single timestamp or a range of time. A request 501 is initiated from a client application program for a specific data set wherein the retrieval component 507 and 511 determines, from configuration information of collection devices 401, the specific application for which information is requested, and a date/time range, to determine information locality. In this manner the retrieval component is able to determine from which of the first system 504 or replicated first systems 508 to issue a request for information.

Preferably processed data is stored in 506 and 510 along with the particular time in the form of a time stamp. Preferably a time series, one point in time or a range of time, is used to store information within the first system 504 and any replicated first systems 508. This allows a retrieval component 507 and 511 to manage access to a specific data set. The use of a time series also enables a retrieval component 507 and 511 to manage the amount of data returned for any given request. The definition of a specific time range allows a retrieval component 507 and 511 to narrow the scope of a request 501 should a specific request result in the retrieval component returning a large amount of data. Attempts to return a very large data set has the ability to overwhelm a retrieval component 507 and 511 as well as the client requesting the data set 501.

Numerous other embodiments may be envisaged without departing from the spirit and scope of this invention

What is claimed is:

1. A method of increasing capacity of a first system to process operational data, wherein the first system has a plurality of interconnected computers connected to receive the operational data from remote data sources, wherein the first system has a software application for processing the operational data received from remote data sources, wherein the operational data characterizes an aspect of performance of one or more software applications running on the remote data sources, the method comprising:
a) determining a load capacity "L" for the first system to be expanded, wherein L>100 and wherein L is the number of remote data sources that can be processed before the system becomes overloaded;
b) while the first system is processing data, repeatedly monitoring incoming remote data sources to determine their number;
c) in dependence upon the number of remote data sources exceeding a predetermined fraction of L greater than 0.5 L and <L, repeatedly replicating the first system to form a plurality of replicated first systems and installing the replicated first systems to increase overall capacity to process data from the remote data sources while the first system is processing data;
d) upon request from a client, retrieving from the first system or one of the replicated systems, data related to a particular requested software application, by using a time stamp or a time series, in the absence of information related to which of the first and replicated systems the data resides in.

2. A method as defined in claim 1 wherein the step of determining load capacity L comprises adding remote data sources while monitoring the first system for an overload condition.

3. A method as defined in claim 2 wherein the step of monitoring includes identifying an IP address host name and time of initial connection of each remote data source.

4. A method as defined in claim 1 wherein the step of replication includes provisioning a copy of the first system wherein the hardware and software are replicated while the first system continues to process operational data.

5. A method as defined in claim 2 wherein the process of installing a replicated system includes modifying a configuration of a collection mechanism on a plurality of remote data sources so that data will be sent to a replicated system.

6. A method as defined in claim 1 wherein the step of retrieving includes accessing a global database to the first system and the replicated systems and providing the time stamp and an identity of the particular software application and receiving the location a system data resides in.

7. A method as defined in claim 6 wherein the step of monitoring incoming remote data sources includes tracking both the number of servers and number of executing processes on each of those servers.

* * * * *